United States Patent
Grgurich

(10) Patent No.: US 8,469,382 B1
(45) Date of Patent: Jun. 25, 2013

(54) MOTORCYCLE FOOTBOARD HEEL REST

(76) Inventor: Philip James Grgurich, Lakeway, TX (US)

( * ) Notice: Subject to any disclaimer, the term of this patent is extended or adjusted under 35 U.S.C. 154(b) by 0 days.

(21) Appl. No.: 13/616,234

(22) Filed: Sep. 14, 2012

(51) Int. Cl.
*B62J 25/00* (2006.01)

(52) U.S. Cl.
USPC .......................................... 280/291; 74/564

(58) Field of Classification Search
USPC .................. 74/564; 280/291, 294, 163, 164.1; 108/50.14, 113, 114
See application file for complete search history.

(56) References Cited

U.S. PATENT DOCUMENTS

| | | | |
|---|---|---|---|
| 3,960,027 A * | 6/1976 | Magnuson | 74/594.6 |
| D483,699 S | 12/2003 | Anthony | |
| 6,719,316 B1 | 4/2004 | Anthony | |
| 7,431,118 B1 | 10/2008 | Hogg | |
| 7,497,291 B1 | 3/2009 | McKim | |
| D599,712 S | 9/2009 | Warren | |
| 7,823,900 B2 | 11/2010 | Warren | |
| 7,997,604 B2 | 8/2011 | Griep | |
| 2005/0241547 A1 | 11/2005 | Colano | |
| 2007/0057484 A1 | 3/2007 | Gilman | |
| 2008/0185208 A1 | 8/2008 | May | |

* cited by examiner

Primary Examiner — Tony Winner
(74) Attorney, Agent, or Firm — David O. Simmons

(57) ABSTRACT

A heel rest apparatus for a motorcycle footboard comprises a one-piece heel rest structure and a locking structure securable to a mating portion of the one-piece heel rest structure. The one-piece heel rest structure includes a heel rest portion and a mounting portion. The heel rest portion has an inwardly curved foot engagement surface at a front portion thereof. A footboard receiving channel is provided within the mounting portion. A footboard engaging portion of the locking structure extends at least partially across a width of the footboard receiving channel when the locking structure is secured to the mating portion of the one-piece heel rest structure for allowing an edge portion of the motorcycle footboard to be captured within the footboard receiving channel.

20 Claims, 1 Drawing Sheet

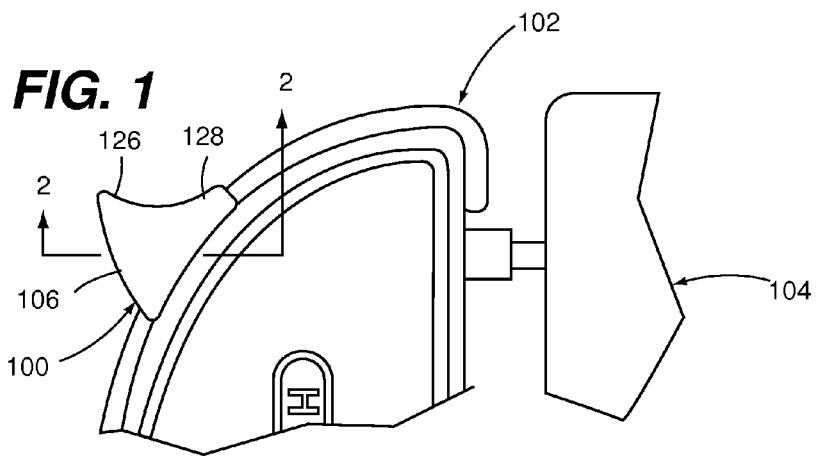
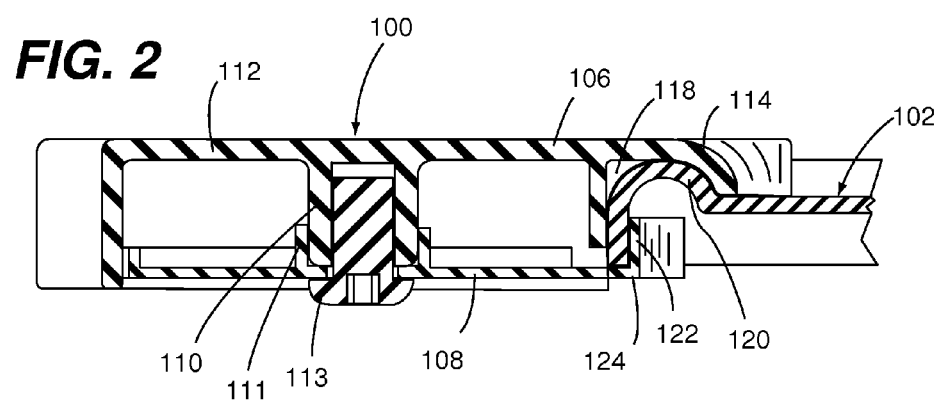
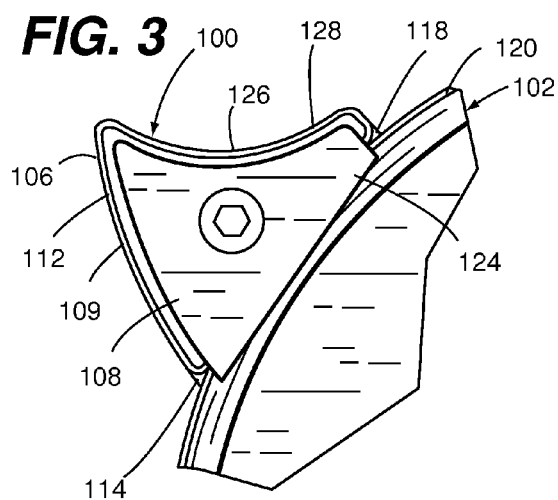
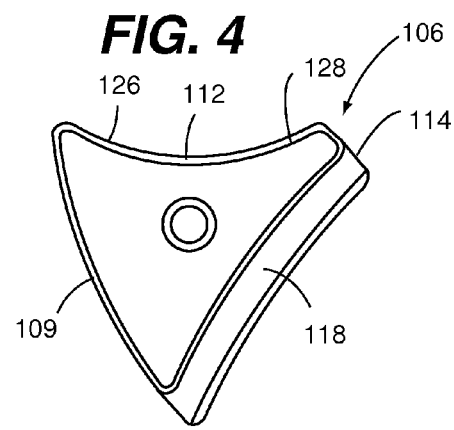

MOTORCYCLE FOOTBOARD HEEL REST

FIELD OF THE DISCLOSURE

The disclosures made herein relate generally to motorcycle accessory items and, more particularly, to accessory items attachable to a motorcycle footboard on which a foot of an operator of the motorcycle can be rested.

BACKGROUND

The use of motorcycle footboards (also sometimes referred to as floorboards) is well known. Footboards offer a flat surface that supports both the sole and heel portion of the rider's (i.e., operator's) shoe or boot. For many motorcycle riders and types of motorcycles, footboards are a preferred foot supporting device because they provide the rider with comfort as a result of the support surface of the footboard establishes a fixed angle of the rider's ankle. However, many riders prefer an alternate foot position for allowing them to stretch their legs while riding and/or that simply offers a different yet equally comfortable foot and leg (i.e., lower body) position.

Accessory items such as highway pegs are well known to offer an alternate foot position for allowing a rider to stretch their legs while riding and that offers a different yet equally comfortable lower body position to a footboard. Highway pegs extend generally outwardly from the left and right sides of the motorcycle thereby providing a pair of support structures that the rider may rest their feet upon while riding the motorcycle (i.e., primarily during highway use). However, for many riders of a motorcycle with footboards, the addition of a highway is undesirable for many reasons. One such reason is that highway pegs and/or their mounting structure are seen as detracting from the aesthetic appeal of the motorcycle. Another such reason is that there may not be a simple means for attaching the highway pegs to the motorcycle.

Therefore, an accessory item mountable on each footboard of a motorcycle that provides a rider of the motorcycle with a supported foot position causing the riders legs to be in an out-stretched orientation in contrast to the rider's leg orientation when the rider's feet are supported directly on top of the footboards would be advantageous, desirable and useful.

SUMMARY OF THE DISCLOSURE

Embodiments of the present invention are directed to a heel rest apparatus for use with a footboard of a motorcycle. A heel rest apparatus configured in accordance with the present invention is an accessory item mountable on each footboard of a motorcycle for providing a rider of the motorcycle with a supported foot position causing the riders legs to be in an out-stretched orientation in contrast to the rider's leg orientation when the rider's feet are supported directly on top of the footboards. Advantageously, a heel rest apparatus configured in accordance with the present invention is mountable in a manner that does not require permanent modification to the footboards and that does not detract from the aesthetic appeal of the motorcycle. In this regard, a heel rest apparatus configured in accordance with the present invention overcomes one or more shortcomings associated with prior art accessory item foot rest structures such as highway pegs.

In one embodiment of the present invention, a heel rest apparatus for a motorcycle footboard comprises a heel rest structure, a mounting structure attached to the heel rest structure, and a locking structure securable to a mating portion of the heel rest structure. The heel rest structure has a heel positioning feature at a front portion thereof. The footboard engaging portion of the mounting structure includes a footboard receiving space configured for having an edge portion of the motorcycle footboard positioned therein. A footboard engaging portion of the locking structure extends at least partially across a width of the footboard receiving space when the locking structure is secured to the mating portion of the heel rest structure for allowing the edge portion of the motorcycle footboard to be captured within the footboard receiving space.

In another embodiment of the present invention, a heel rest apparatus for a motorcycle footboard comprises a one-piece heel rest structure and a locking structure securable to a mating portion of the one-piece heel rest structure. The one-piece heel rest structure includes a heel rest portion and a mounting portion. The heel rest portion has an inwardly curved foot engagement surface at a front portion thereof. A footboard receiving channel is provided within the mounting portion. A footboard engaging portion of the locking structure extends at least partially across a width of the footboard receiving channel when the locking structure is secured to the mating portion of the one-piece heel rest structure for allowing an edge portion of the motorcycle footboard to be captured within the footboard receiving channel.

In another embodiment of the present invention, a motorcycle comprises a footboard, a heel rest structure extending outwardly from an edge portion of the footboard, and a locking structure secured to a mating structure of the heel rest structure. The heel rest structure includes a heel rest portion and a mounting portion. The heel rest portion has a heel positioning feature at a front portion thereof. The mounting portion has a footboard receiving space therein. The edge portion of the footboard is positioned within the footboard receiving space. A footboard engaging portion of the locking structure extends at least partially across a width of the footboard receiving space for capturing the edge portion of the motorcycle footboard within the footboard receiving space.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a fragmentary top plan view of a motorcycle having a footboard with a heel rest apparatus configured in accordance with an embodiment of the present invention mounted thereon.

FIG. 2 is a cross-sectional view taken along the line 2-2 in FIG. 1.

FIG. 3 is fragmentary bottom plan view of the footboard and heel rest apparatus shown in FIG. 1.

FIG. 4 is a bottom plan view of a heel rest structure of the heel rest apparatus shown in FIG. 1.

DETAILED DESCRIPTION OF THE DRAWING FIGURES

FIGS. 1-3 show a heel rest apparatus 100 configured in accordance with an embodiment of the present invention. The heel rest apparatus 100 is mounted on a footboard 102 of a motorcycle 104. Advantageously, each footboard of the motorcycle 104 (i.e., the footboard 102 and a footboard on the opposite side of the motorcycle 104) will typically have an instance of the heel rest apparatus 100 mountable thereon for providing a rider of the motorcycle 104 with a supported foot position causing legs of an operator of the motorcycle 104 to be in an out-stretched orientation in contrast to the operator's legs orientation when the operator's feet are supported directly on top of the footboards. Heels of the motorcycle operator rest on a forward edge portion of each heel rest apparatus 100. As will be seen from the following disclosure, the heel rest apparatus 100 does not require permanent modification to the footboard 102 and does not detract from the aesthetic appeal of the motorcycle 104. In this regard, the heel rest apparatus 100 overcomes one or more shortcomings associated with prior art accessory item foot rest structures such as highway pegs.

The heel rest apparatus 100 includes a heel rest structure 106 and a locking structure 108. The locking structure 108 is securable to a mating portion 110 of the heel rest structure 106. In one embodiment, the mating portion 110 of the heel rest structure 106 is a mounting boss that is located within a cavity within a rear face 109 of the heel rest structure 106. The locking structure 108 can include an alignment feature that positively aligns the locking structure 108 to the heel rest structure 106 (e.g., a receptacle 111 shown in FIG. 2 that engages the mating portion 110 of the heel rest structure 106). As shown in FIG. 2, the locking structure 108 and the mating portion 110 of the heel rest structure 106 are secured together by means of a fastener 113 such as a screw that threadedly engages mating threads within the mounting boss.

The heel rest structure 106 includes a heel rest portion 112 and a mounting portion 114. As shown, the heel rest structure 106 can be a one-piece structure such that the heel rest portion 112 and the mounting portion 114 are unitarily formed from a common piece of material. Alternatively, the heel rest structure 106 can be a multi-piece structure such that the heel rest portion 112 and the mounting portion 114 are separately formed and then attached to each other in a suitable manner (e.g., welding, mechanical fastener(s), etc).

As best shown in FIGS. 2-4, a footboard receiving channel 118 is provided within the mounting portion 114 of the heel rest structure 106. The footboard receiving channel 118 is one example of a space within the heel rest structure 106 that is configured for receiving an edge portion 120 of the footboard 102 therein (i.e., a footboard receiving space). The footboard receiving channel 118 has a closed end portion and an open end portion. The closed end portion is accessible through the open end portion. The open end portion of the footboard receiving channel 118 is adjacent the rear face 109 of the heel rest structure 106. In preferred embodiments, at least a portion of cross-sectional profile of the footboard receiving channel 118 is substantially the same as an exterior surface profile of the edge portion 120 of the footboard 102. For example, as shown in FIG. 2, a segment of an interior surface of the mounting portion 114 has a curvature substantially the same as a curvature of an upper wall of the edge portion 120 of the footboard 102 and a segment of the interior surface of the mounting portion 114 is substantially straight to engage a substantially straight segment of a sidewall of the edge portion 120 of the footboard 102.

The locking structure 108 has a footboard engaging portion 124 that extends at least partially across a width of the footboard receiving channel 118 when the locking structure 108 is secured to the mating portion 110 of the heel rest structure 106 for allowing the edge portion 120 of the footboard 102 to be captured within the footboard receiving channel 118. The locking structure 108 can include an upwardly extending flange 122 that limits lateral translation of the edge portion 120 of the footboard 102 within the footboard receiving channel 118. In this regard, the locking structure 108 and the mounting portion 114 (e.g., the footboard receiving channel 118 thereof) are jointly configured for causing the edge portion 120 of the footboard 102 to become clamped between the mounting structure 114 and the locking structure 108 when the locking structure 108 is secured to the mating portion 110 of the heel rest structure 106.

As shown in FIGS. 1, 3, and 4, the heel rest portion 112 of the heel rest structure 106 has an inwardly curved foot engagement surface 126. The inwardly curved foot engagement surface 126 is located at a front portion 128 of the heel rest structure 106. The inwardly curved foot engagement surface 126 is one example of a heel positioning feature. The intent of such a heel positioning feature is to positively locate a heel portion of a foot of the motorcycle operator (i.e., boot or shoe thereof) relative to the front portion 128 of the heel rest structure 106 for limiting the potential for the heel portion of the motorcycle operator's foot to unintentionally slip off of the heel rest structure 106. To this end, a heel positioning feature of a heel rest structure configured in accordance with the present invention can be implemented in a variety of forms. For example, the heel positioning feature can be implemented in the form of spaced apart ridges on a front edge of the heel rest structure 106, in the form of a discrete article attached to the heel rest structure 106 and having a heel positioning feature integral therewith, in the form of posts/projections that protrude forward of the front portion 128 of the heel rest structure 106, or any other suitable structure that serves as a means for limiting the potential for the motorcycle operator's foot (i.e., the heel portion thereof) to unintentionally slip off of the heel rest structure 106. It is disclosed herein that embodiments of the present invention are not limited to any particular means for providing such positive foot positioning functionality.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A heel rest apparatus for a motorcycle footboard, comprising:

a heel rest structure having a heel positioning feature at a front portion thereof;

a mounting structure attached to the heel rest structure, wherein a footboard engaging portion of the mounting structure includes a footboard receiving space configured for having an edge portion of the motorcycle footboard positioned therein; and a locking structure securable to a mating portion of the heel rest structure, wherein a footboard engaging portion of the locking structure extends at least partially across a width of the footboard receiving space when the locking structure is secured to the mating portion of the heel rest structure for allowing the edge portion of the motorcycle footboard to be captured within the footboard receiving space.

2. The heel rest apparatus of claim 1 wherein:
the footboard receiving space includes a channel for receiving the edge portion of the motorcycle footboard therein;
a closed end portion of the channel is accessible through an open end portion of the channel; and
the open end portion of the channel is adjacent a rear face of the heel rest structure.

3. The heel rest apparatus of claim 2 wherein at least a portion of a cross-sectional profile of the channel is substantially the same as an exterior surface profile of the edge portion of the motorcycle footboard.

4. The heel rest apparatus of claim 3 wherein the locking structure and the channel are jointly configured for causing the edge portion of the motorcycle footboard to become clamped between the mounting structure and the locking structure when the locking structure is secured to the mating portion of the heel rest structure.

5. The heel rest apparatus of claim 4 wherein the heel positioning feature includes an inwardly curved foot engagement surface.

6. The heel rest apparatus of claim 1 wherein the heel positioning feature includes an inwardly curved foot engagement surface.

7. The heel rest apparatus of claim 1 wherein the mating portion of the heel rest structure to which the locking structure is securable is located within a cavity within a rear face of the heel rest structure.

8. The heel rest apparatus of claim 1 wherein the footboard engaging portion of the locking structure has a flange that extends into the footboard receiving space.

9. The heel rest apparatus of claim 1 wherein at least a portion of a cross-sectional profile of the channel is substantially the same as an exterior surface profile of the edge portion of the motorcycle footboard.

10. A heel rest apparatus for a motorcycle footboard, comprising:
a one-piece heel rest structure including a heel rest portion and a mounting portion, wherein the heel rest portion has an inwardly curved foot engagement surface at a front portion thereof and wherein a footboard receiving channel is provided within the mounting portion; and
a locking structure securable to a mating portion of the one-piece heel rest structure, wherein a footboard engaging portion of the locking structure extends at least partially across a width of the footboard receiving channel when the locking structure is secured to the mating portion of the one-piece heel rest structure for allowing an edge portion of the motorcycle footboard to be captured within the footboard receiving channel.

11. The heel rest apparatus of claim 10 wherein the mating portion of the heel rest structure to which the locking structure is securable is located within a cavity within a rear face of the heel rest structure.

12. The heel rest apparatus of claim 10 wherein the locking structure and the footboard receiving channel are jointly configured for causing the edge portion of the motorcycle footboard to become clamped between the mounting portion and the locking structure when the locking structure is secured to the mating portion of the heel rest structure.

13. The heel rest apparatus of claim 10 wherein:
a closed end portion of the footboard receiving channel is accessible through an open end portion of the footboard receiving channel; and
the open end portion of the footboard receiving channel is adjacent a rear face of the heel rest portion.

14. The heel rest apparatus of claim 13 wherein at least a portion of a cross-sectional profile of the footboard receiving channel is substantially the same as an exterior surface profile of the edge portion of the motorcycle footboard.

15. The heel rest apparatus of claim 14 wherein the locking structure and the footboard receiving channel are jointly configured for causing the edge portion of the motorcycle footboard to become clamped between the mounting portion and the locking structure when the locking structure is secured to the mating portion of the heel rest structure.

16. A motorcycle, comprising
a footboard;
a heel rest structure extending outwardly from an edge portion of the footboard, wherein the heel rest structure includes a heel rest portion and a mounting portion, wherein the heel rest portion has a heel positioning feature at a front portion thereof, wherein the mounting portion has a footboard receiving space therein, and wherein the edge portion of the footboard is positioned within the footboard receiving space; and
a locking structure secured to a mating structure of the heel rest structure, wherein a footboard engaging portion of the locking structure extends at least partially across a width of the footboard receiving space for capturing the edge portion of the motorcycle footboard within the footboard receiving space.

17. The motorcycle of claim 16 wherein:
a closed end portion of the footboard receiving channel is accessible through an open end portion of the footboard receiving channel;
the open end portion of the footboard receiving channel is adjacent a rear face of the heel rest portion; and
at least a portion of a cross-sectional profile of the footboard receiving channel is substantially the same as an exterior surface profile of the edge portion of the motorcycle footboard.

18. The motorcycle of claim 16 wherein the locking structure and the footboard receiving space are jointly configured for causing the edge portion of the motorcycle footboard to become clamped between the mounting portion and the locking structure when the locking structure is secured to the mating portion of the heel rest structure.

19. The motorcycle of claim 16 wherein:
the mating portion of the heel rest structure to which the locking structure is securable is located within a cavity within a rear face of the heel rest structure; and
the locking structure is secured to the heel rest structure solely by a threaded fastener engaged with the mating portion of the heel rest structure.

20. The motorcycle of claim 19 wherein the locking structure and the footboard receiving space are jointly configured for causing the edge portion of the motorcycle footboard to become clamped between the mounting portion and the locking structure when the locking structure is secured to the mating portion of the heel rest structure.

* * * * *